United States Patent Office 3,474,112
Patented Oct. 21, 1969

3,474,112
α-TETRONIC ACID DERIVATIVES
Eugene E. Galantay, Morristown, N.J., assignor to Sandoz Inc., Hanover, N.J.
No Drawing. Filed Apr. 6, 1967, Ser. No. 628,847
Int. Cl. C07d 5/10; A61k 27/00
U.S. Cl. 260—343.6
3 Claims

ABSTRACT OF THE DISCLOSURE

The compounds are of the class of β-(β'-aminoalkyl)-α-tetronic acids, e.g., β-(β'-aminoethyl)-α-tetronic acid. They are useful as antidepressants, anorexics and sedatives. They are prepared by reacting an ethyl γ-unsubstituted or γ-lower alkyl-substituted-γ-phthalimidobutyrate with diethyl oxalate in the presence of a base, e.g., NaH, to obtain the corresponding ethyl α-ethoxalyl-γ-phthalimidobutyrate which is then hydroxymethylated to form an intermediate compound which is converted to the corresponding β-(β'-aminoalkyl)-α-tetronic acid by heating with a concentrated aqueous mineral acid, e.g., hydrochloric acid.

---

The compounds of this invention are β-(β'-aminoethyl)-tetronic acids of the formula:

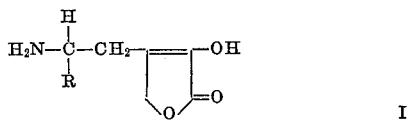

wherein R is a member selected from the group consisting of a hydrogen atom and straight chain lower alkyl, e.g. methyl, ethyl, propyl or butyl, and intermediates thereof (the definition of R is used consistently throughout the disclosure in the absence of an indication to the contrary).

Acid addition salts of compounds I are prepared according to the following reation scheme A:

Step a

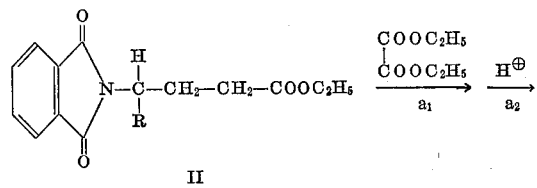

Step b

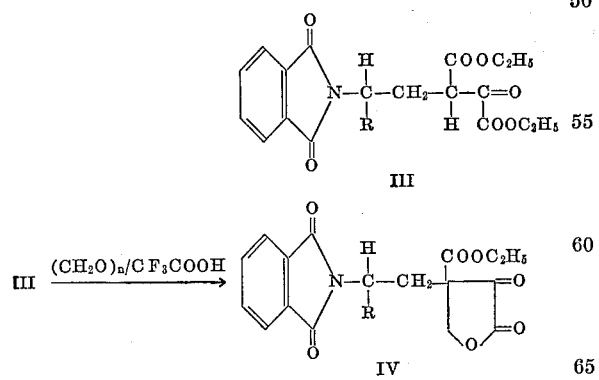

Step c

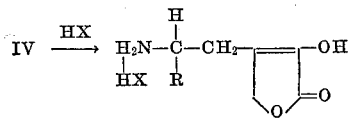

According to reaction scheme A Step a involves two phases ($a_1$ and $a_2$). In phase $a_1$ a compound II is ethyloxalylated, e.g., by reacting with diethyl oxalate in the presence of a base, preferably a basic alkali metal compound, e.g., sodium hydride, preferably in a suitable solvent, e.g., absolute benzene and with an antioxidant, e.g., hydroquinone, by agitating at from 0° to 80°, e.g., at 20° for from 2 to 4 days, to form an alkali metal salt of the corresponding compound III, i.e., the corresponding ethyl T-ethoxalyl-γ-R-γ-phthalimidobutyrate, which is then acidified (stage $a_2$) to obtain the free form of compound III.

In Step b the compound III is hydroxymethylated under acid conditions to the corresponding compound IV, e.g., by refluxing for from 1½ to 6 hours with paraformaldehyde in the presence of trifluoroacetic acid.

In Step c the compound IV is converted to the acid addition salt of the corresponding compound I, by heating, e.g., refluxing, with a concentrated aqueous mineral acid (HX), e.g., constant boiling hydrochloric acid, preferably in a co-solvent, e.g. glacial acetic acid or propionic acid. The salt may be converted to the free base form of compound I by known methods.

It is preferred to carry out Steps b and c sequentially, i.e., without isolation or purification of the compound IV obtained in Step b.

Compound III exists in tautomeric forms and all such tautomers are within the scope of this invention. The formula for compound III, presented above, depicts one such tautomer and is used to represent the various tautomers of compound III. If desired, the individual tautomers may be isolated by known means. The enolic tautomers of compound III are of the formula

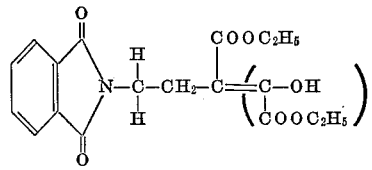

IIIt

Compounds II are obtainable by known methods. For example, compounds II may be prepared according to the following reaction scheme B.

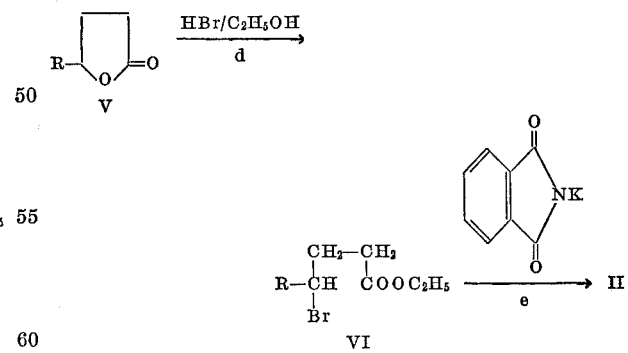

According to reaction scheme B, in Step d a γ-butyrolactone (compound V) is allowed to stand overnight at from 10° to 20° in a hydrogen bromide-saturated solution of ethanol to form the corresponding ethyl γ-bromobutyrate (compound VI) which is then converted to the corresponding compound II by reacting with potassium phthalimide, e.g., by heating in a solvent, e.g., N,N-dimethylformamide (DMF) at from 35° to 70° with agitation for from 12 to 24 hours.

In preparing β-(β'-aminoethyl)-α-tetronic acid, i.e., a compound I wherein R is a hydrogen atom, the suitable compound II, i.e., compound IIa, may be obtained according to the following reaction scheme C.

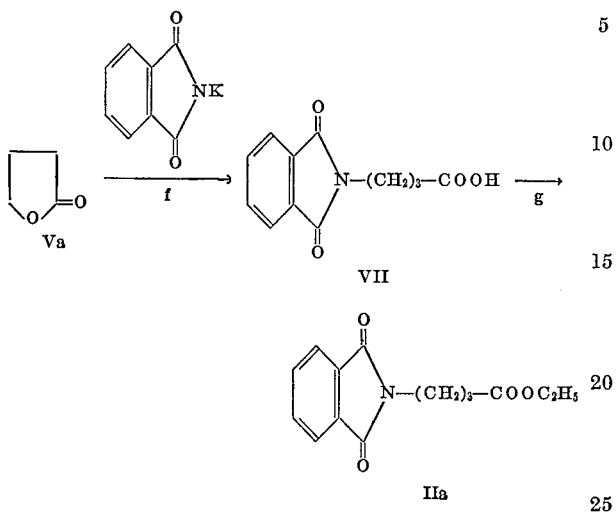

According to reaction scheme C, Step f is effected by heating, e.g., refluxing, γ-butyrolactone (compound Va) with potassium phthalimide preferably is a solvent, e.g., DMF, for from 1 to 2 days. The potassium salt of compound VII is recovered and acidified to form the free acid (compound VII).

Step g is effected by mixing compound VII with cold (0° to 15°) hydrogen chloride-saturated absolute ethanol and holding the mixture for from 1 to 24 hours at from 0° to 10°.

Compounds I, and their pharmaceutically acceptable acid addition salts, are useful as intidepressants, anorexics and sedatives. They are administered to mammals either orally or parenterally in daily doses of from 5 to 20 mg./kg. of body weight, e.g., from 300 to 1200 milligrams per diem, preferably administered in divided doses from 2 to 4 times a day; a single daily oral dose is also acceptable.

The acid addition salts of compounds I are prepared according to well-known procedures from compounds I. They are all useful, in accord with recognized procedures, for the preparation of corresponding pharmaceutically acceptable salts.

Among the pharmaceutically acceptable acid addition salts are salts of organic acids, e.g., tartaric acid; inorganic acids, e.g., hydrochloric acid, hydrobromic acid and sulfuric acid; monobasic acids, e.g., an alkylsulfonic acid, such as methylsulfonic acid ($H_3C$—$SO_3H$); dibasic acids, e.g., succinic acid, tribasic acids, e.g., phosphoric acid and citric acid; saturated acids, e.g., acetic acid; ethylenically unsaturated acids, e.g. maleic acid and fumaric acid; and aromatic acids, e.g. salicylic acid and arylsulfonic acids, such as phenylsulfonic acid. The only limitation on the acid is that the resulting salt be pharmaceutically acceptable; it is preferred, however, that the acid addition salt be water soluble.

Each of the pharmaceutically active compounds of this invention may be, e.g., incorporated, for oral administration, in a tablet as the sole active ingredient. A typical tablet is constituted by from 1 to 3 percent binder, e.g., tragacanth; from 3 to 10 percent disintegrating agent, e.g., corn starch; from 2 to 10 percent lubricant, e.g., talcum; from 0.25 to 1.0 percent lubricant, e.g., magnesium stearate; an average dosage of active ingredient; and q.s. 100 percent of filler, e.g., lactose; all percentages being by weight. Tablets are prepared according to standard tabletting techniques, which are well-known in the art, employing the necessary amounts of conventional granulating liquids, e.g., alcohol SD–30 and purified water. An exemplary tabletting formulation for the instant active compounds is:

|  | Parts |
| --- | --- |
| Title Compound of Example 1 | 75 |
| Tragacanth | 2 |
| Lactose | 14.5 |
| Corn starch | 5 |
| Talcum | 3 |
| Magnesium stearate | 0.5 |
| Alcohol SD–30, q.s. |  |
| Purified water, q.s. |  |

Examples illustrative of this invention follow. Throughout this disclosure all temperatures are centigrade, room temperature is 20° C. and all percents and parts are by weight, unless specified otherwise. Parts by weight are related to parts by volume as a kilogram is related to a liter.

EXAMPLE 1

β-(β'-aminoethyl)-α-tetronic acid hydrochloride

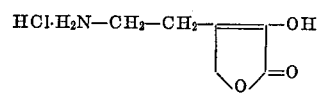

This example illustrates the preparation of the title compound which is a compound I.

(a) Ethyl γ-phthalimidobutyrate

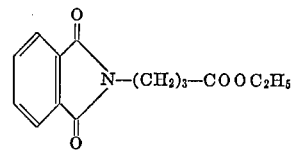

Add over a period of 30 minutes 770 parts of γ-butyrolactone to a refluxing mixture of 1650 parts of potassium phthalimide in 2500 parts by volume of DMF and maintain refluxing for 37 hours. Cool the mixture to 20° C. and add 300 parts by volume of benzene to precipitate the potassium salt of γ-phthalimidobutyric acid. Collect the salt by filtration and wash with benzene and ether. Dissolve the salt in 5000 parts by volume of water, wash the solution thrice with 500 parts by volume portions of ethyl acetate, then acidify with concentrated hydrochloric acid to pH 1 to 2 to precipitate the free γ-phthalimidobutyric acid. Collect the crude acid by filtration, wash with water, then crystallize from acetone-petroleum ether to obtain the purified γ-phthalimidobutyric acid, melting point (M.P.) 114° to 115°.

Suspend with stirring 280 parts of the purified γ-phthalimidobutyric acid in 3000 parts by volume of absolute ethanol and saturate with hydrogen chloride at 10°. Continue stirring to obtain a solution. Allow the solution to stand at 5° for 18 hours, then collect the precipitated crystalline ester (a), M.P. 73° to 74°.

(b) Ethyl α-ethoxalyl-γ-phthalimidobutyrate

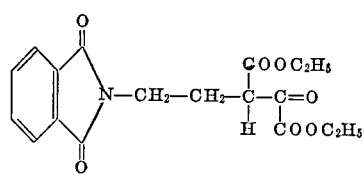

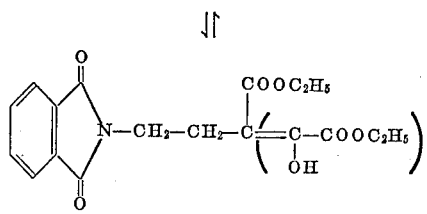

Add 146 parts of diethyl oxalate and 0.5 part by volume of absolute ethanol to a stirred suspension of 24.0 parts of sodium hydride (from 43.7 parts of a 55% mineral oil suspension) in 200 parts by volume of absolute benzene. Then add dropwise a solution of 261 parts of (a) in 1200 parts by volume of absolute benzene. Stir the mixture at room temperature for 60 hours (all the sodium hydride dissolves and a brown solution forms). Extract the mixture thrice with 700 parts by volume portions of water at 5°. Backwash with benzene, acidify the combined aqueous extracts to pH 2 with concentrated hydrochloric acid and extract with chloroform to obtain (b) as a crystallizing oil.

(c) β-(β'-aminoethyl)α-tetronic acid hydrochloride

Reflux for 2 hours a mixture of 122.2 parts of (b), 21.8 parts of paraformaldehyde and 213 parts of trifluoroacetic acid. Evaporate the reaction mixture to dryness to obtain a residual oil (FeCl₃ test negative). Reflux the residual oil for 2 hours with a mixture of 200 parts by volume of glacial acetic acid 500 parts by volume of 11 N hydrochloric acid and 0.2 parts of hydroquinone. Concentrate the reaction mixture under vacuum to 200 parts and store overnight at 5°. Remove the solid precipitate (melting point 173° to 175°, mostly phthalic acid) by filtration and evaporate the filtrate under vacuum to obtain an oily residue. Triturate the oily residue with absolute ethanol to obtain the title compound, M.P. 172° to 175°.

EXAMPLE 2

β-(β'-Aminopropyl)-tetronic acid hydrochloride

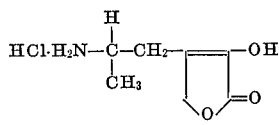

This example illustrates the preparation of the title compound which is a compound I.

(a) Ethyl γ-phthalimidovalerate

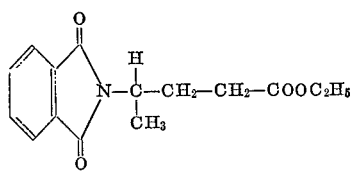

Add dropwise a solution of 29.2 parts of ethyl γ-bromovalerate in 90 parts by volume of DMF (over a period of 30 minutes) to a stirred suspension of 25.8 parts of potassium phthalimide in 150 parts by volume of DMF at 50°. Stir the mixture for 18 hours at 50° then bring the temperature of the mixture up to 150°, then cool the mixture to 20° and pour on to ice. Extract the mixture with chloroform. Evaporate the extract under vacuum to obtain an oil. Dissolve the oil in 60 parts by volume of benzene and percolate the benzene solution through a column of alumina (activity grade III). Evaporate the benzene solution to obtain (a), M.P. 47° to 50°.

(b) Ethyl α-ethoxalyl-γ-phthalimidovalerate

Stir a mixture of 158.0 parts of (a), 88.3 parts of diethyl oxalate 900 parts by volume of absolute benzene and 26.1 parts of a 53.3% sodium hydride-mineral oil suspension and stir at room temperature in a nitrogen atmosphere for 3 days. Collect by filtration from the reaction mixture a yellow precipitate, which is the sodium salt of (b). Wash the salt with benzene and dry at room temperature to obtain the purified salt of (b), M.P. 218° to 220° (melts with decomposition).

Dissolve the purified salt of (b) in water, then acidify to pH 2. Extract with chloroform and evaporate the extract to obtain (b) in the free form (a yellow viscous oil.)

(c) β-(β'-aminopropyl)-α-tetronic acid hydrochloride

Reflux for 2½ hours a mixture of 52.9 parts of (b), 10.6 parts of paraformaldehyde and 106 parts of trifluoroacetic acid. Evaporate under vacuum to obtain an oily residue. Mix the oily residue with 0.2 part of hydroquinone, 176 parts by volume of glacial acetic acid and 440 parts by volume of 11 N hydrochloric acid and reflux for 4 hours. Allow the mixture to stand at room temperature overnight, then separate the precipitate (phthalic acid), concentrate the filtrate under vacuum to 100 parts by volume and remove additional precipitate. Concentrate the filtrate under vacuum to obtain a residual oil. Dissolve the residual oil in 600 parts by volume of water and filter to clarify, buffer the aqueous solution with 150 parts by volume of 10% sodium acetate solution to pH 5.5, wash with 100 parts by volume of ethyl acetate, then add a solution of 64 parts of sodium tetraphenylboronate in 800 parts by volume of water to obtain a gummy precipitate. Collect the gummy precipitate by filtration, wash with water, air dry, then wash with ether to obtain the tetraphenylboronate of β-(β'-aminopropyl)-α-tetronic acid as a colorless solid which melts with decomposition at 113° to 115°.

Dissolve 12.0 parts of the tetraphenylboronate in a mixture of 400 parts by volume of 95% ethanol and 100 parts by volume of acetone. Add 3.46 parts of cesium chloride in 400 parts by volume of 87% aqueous ethanol to the solution, with stirring, to form a precipitate of cesium tetraphenylboronate. Concentrate the solution under vacuum to 100 parts by volume and remove additional precipitate by filtration. Evaporate the filtrate under vacuum to dryness to obtain a colorless foam, which then crystallizes from methanol-isopropyl alcohol-ether to obtain the title compound which melts with decomposition at 176° to 179° and gives a purple color with FeCl₃.

Replacing the ethyl γ-bromovalerate with an equivalent amount of ethyl γ-bromooctanoate results in the preparation, in a similar manner, of the corresponding acid addition salt of compound I, i.e., β-(β'-aminohexyl)-tetronic acid hydrochloride.

What is claimed is:
1. A member selected from the group consisting of a compound of the formula

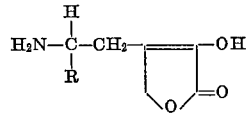

wherein R is a member selected from the group consisting of a hydrogen atom and straight chain lower alkyl; and a pharmaceutically acceptable acid addition salt thereof.

2. The compound according to claim 1 wherein R is a hydrogen atom.

3. The compound according to claim 1 wherein R is methyl.

References Cited

FOREIGN PATENTS 1,026,403   4/1966   Great Britain.

ALEX MAZEL, Primary Examiner

ANNE MARIE TIGHE, Assistant Examiner

U.S. Cl. X.R.

260—326; 424—279